United States Patent [19]

Schier

[11] Patent Number: 5,635,919
[45] Date of Patent: Jun. 3, 1997

[54] SENSING APPARATUS

[76] Inventor: J. Alan Schier, 260 Avenida Vista Montana, Unit 21P, San Clemente, Calif. 92672

[21] Appl. No.: 118,090

[22] Filed: Sep. 8, 1993

Related U.S. Application Data

[63] Continuation of Ser. No. 563,510, Aug. 6, 1990, abandoned.

[51] Int. Cl.$^6$ ................................................. G08C 19/16
[52] U.S. Cl. ........................ 340/870.26; 340/870.18; 340/870.28; 340/870.42
[58] Field of Search .................... 340/870.18, 870.26, 340/870.28, 870.31, 870.42; 345/179; 359/143; 324/617, 622, 633, 637, 639, 640; 73/705; 250/227.14, 227.16; 342/118, 125, 126, 127, 128, 134, 137; 356/4, 5

[56] References Cited

U.S. PATENT DOCUMENTS

| | | | |
|---|---|---|---|
| 3,461,382 | 8/1969 | Anderson | 340/870.42 |
| 4,006,405 | 2/1977 | Greenwood et al. | 324/227 |
| 4,129,831 | 12/1978 | Fink et al. | 324/622 |
| 4,249,076 | 2/1981 | Bergstrom et al. | 250/227.14 |
| 4,493,995 | 1/1985 | Adolfsson et al. | 359/143 |
| 4,713,540 | 12/1987 | Gilby et al. | 250/231 R |
| 4,725,728 | 2/1988 | Brininstool et al. | 250/227.14 |
| 4,733,561 | 3/1988 | Gilby | 340/870.28 |
| 4,885,433 | 12/1989 | Schier | 340/707 |
| 4,928,004 | 5/1990 | Zimmermann et al. | 250/227.14 |
| 4,935,738 | 6/1990 | Pilato | 340/870.31 |
| 5,012,049 | 4/1991 | Schier | 340/707 |
| 5,119,034 | 6/1992 | Ishikawa et al. | 324/633 |
| 5,138,152 | 8/1992 | Botting | 250/227.16 |
| 5,188,983 | 2/1993 | Guckel et al. | 437/209 |

FOREIGN PATENT DOCUMENTS 2207236A  1/1989  United Kingdom ................... 73/705

Primary Examiner—Jeffery Hofsass
Assistant Examiner—Andrew Hill
Attorney, Agent, or Firm—Cislo & Thomas

[57] ABSTRACT

An apparatus for determining various physical quantities such as temperature, pressure, stress, strain, distance and the like in a manner such that a change in the physical quantity of interest results in a measurable change in the frequency of oscillation of a signal generated within the apparatus.

8 Claims, 4 Drawing Sheets

SENSING APPARATUS

CROSS-REFERENCE TO RELATED APPLICATION

This is a continuation of application Ser. No. 07/563,510, filed Aug. 6, 1990, abandoned.

BACKGROUND OF THE INVENTION

1. Field of The Invention

This invention relates generally to an apparatus for determining various physical quantities and for accomplishing non-contacting distance measurement. More particularly, the invention concerns an apparatus for determining various physical quantities such as temperature, pressure, stress, strain and the like, in a manner such that the changes in a physical quantity of interest, including changes in distance, result in changes in the frequency of oscillation of a signal generated within the apparatus.

2. Discussion of The Invention

The vast majority of prior art sensing and transducing systems rely on converting the physical quantity of interest into an analog voltage or current at some stage of the signal processing. An example of this is the strain gages that are used as the transducer systems for measuring strain, pressure, force and various other physical quantities.

Such systems bring with them the inherent problems of minimizing the noise that is introduced into the signal and of determining the true signal level in the inevitable presence of at least some noise. Overcoming these problems typically results in systems that are either delicate, expensive, or both.

A limited number of other transducing systems attempt to directly measure the time delay or "time of flight" of a signal directed over some particular path in order to measure a physical property of interest. Such systems typically are used to measure distance, as in the case of radar, or electrical characteristic impedance, as can be done with a time-domain reflectometer. At the most fundamental level, these systems depend on measuring the time delay between a transmitted and a subsequently received signal.

In these systems, the necessary accuracy for the measurement of this delay can be in the sub-nanosecond range, and direct measurement of such time intervals is a substantial technical challenge. A limited number of other systems as exemplified by U.S. Pat. No. 4,885,433 (Schier) avoid the direct time interval measurement and make use of the phase difference introduced into a modulated signal by the time delay. It is of course then necessary to measure this phase difference, a process which is also sensitive to external influences and noise of various sorts. Furthermore, some systems resort to converting the time delay or phase difference into a voltage by means of an appropriate circuit, and this brings with it the problems previously mentioned.

Lastly, one small group of devices specifically converts a velocity of interest directly into a frequency by taking advantage of the doppler shift introduced by some moving object of interest. This group is typified by doppler radar systems and so-called "ring-around flow meters". These devices function by transmitting a signal at a moving target of interest (in the case of the radar) or through a moving medium of interest (in the case of the flow meter). Due to the motion of the target or the medium, the frequency of the signal is shifted, and this frequency is then detected by any of a variety of means. In many cases, and in particular in the case of doppler radar, an intermediate step of homodyne or heterodyne conversion is necessary before the frequency of interest can be detected.

In any device relying on a doppler shift, if the object of interest is receding from the transmitter the signal which is subsequently detected is lowered. Conversely, if the object is approaching the transmitter, the frequency is increased. Inevitably, such devices are adapted to measure only the velocity of the object of interest.

The thrust of the present invention is to provide an apparatus for measuring a number of different physical quantities in a manner such that a change in the physical quantity of interest results in a change in the frequency of oscillation of a signal generated within the apparatus. The invention relies on a feedback system which is made to self-oscillate at a frequency determined by the overall transmission delays in the system. The system is configured so that variation in the physical quantity of interest cause a variation in the transmission delay and consequently cause a change in the frequency of oscillation. For example, to sense the temperature a signal transmission path occupied by gas at constant pressure might be used. In this instance, as the temperature of the gas increases, the gas becomes less dense, lowering its index of refraction. This means that an electromagnetic signal transmitted through the gas will have a higher velocity in the gas, thus decreasing the overall transmission delay. This decrease in transmission delay results in a higher frequency of oscillation in the system. Another example could involve the use as a signal transmission medium of selected electro-optic materials whose properties change as a function of an external electric or magnetic field. Still another example could involve the use of an optical fiber whose index of refraction varies as a function of stress or strain applied to the fiber.

SUMMARY OF THE INVENTION

It is an object of the present invention to provide a multi-purpose sensing and transducing system adaptable to sensing a wide variety of physical quantities. With the same basic signal processing system, this invention is easily adapted to measuring absolute distance, index of refraction, stess, strain, force, torque, temperature, pressure, magnetic field strength, electric field strength and other physical quantities.

Another object of the invention is the conversion of the physical quantity of interest into the frequency of a signal which can be readily measured. Conversion to a frequency has the specific advantage that a frequency can be measured to within one part in one million with no special effort or expense whatsoever, and with very moderate effort, frequency can be measured to within one part in one billion. It is generally accepted that the measurement of frequency is among the easiest and most accurate measurements that can be made.

A further object of the invention is to achieve the conversion of the quantity of interest into a frequency with no intermediate electronic processing steps, thus eliminating the additional complexity, inaccuracy, cost, and noise inevitably associated with such processing.

Still another object of the invention is to provide a means for realizing a position determining apparatus which is suitable for use in multiple dimensions. Such a device might be used as an improved replacement for a conventional computer mouse since it could quite easily be made to occupy a pen-shaped housing.

3

Figure 2:
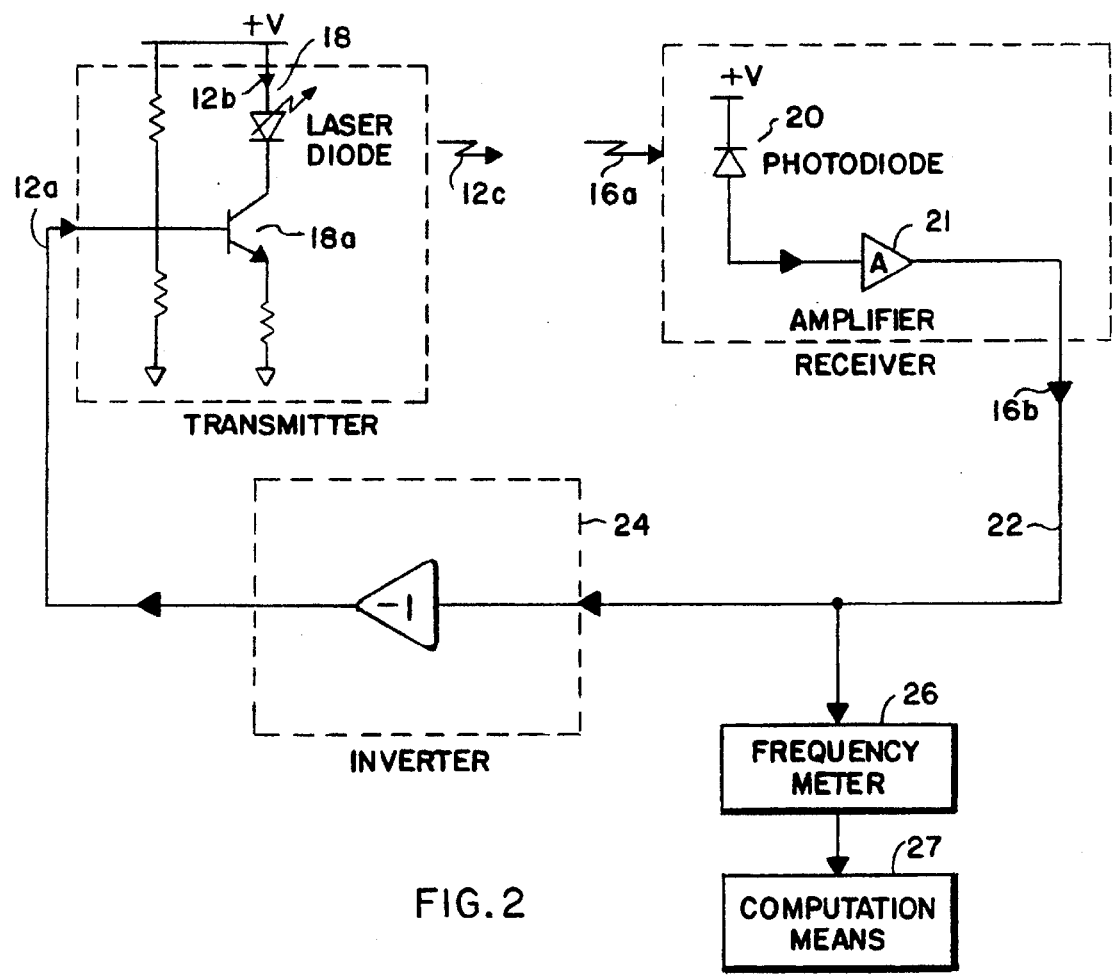

FIG. 2 is one possible schematic diagram for the preferred embodiment of the invention.

Figure 3:
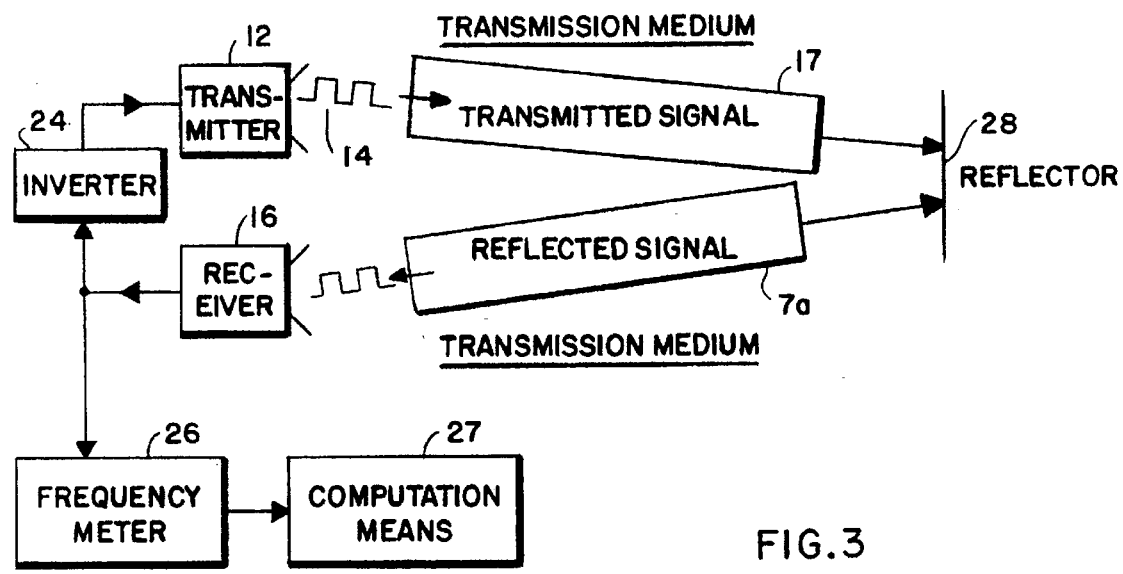

FIG. 3 is a diagrammatic view of an alternate embodiment of the invention.

Figure 4:
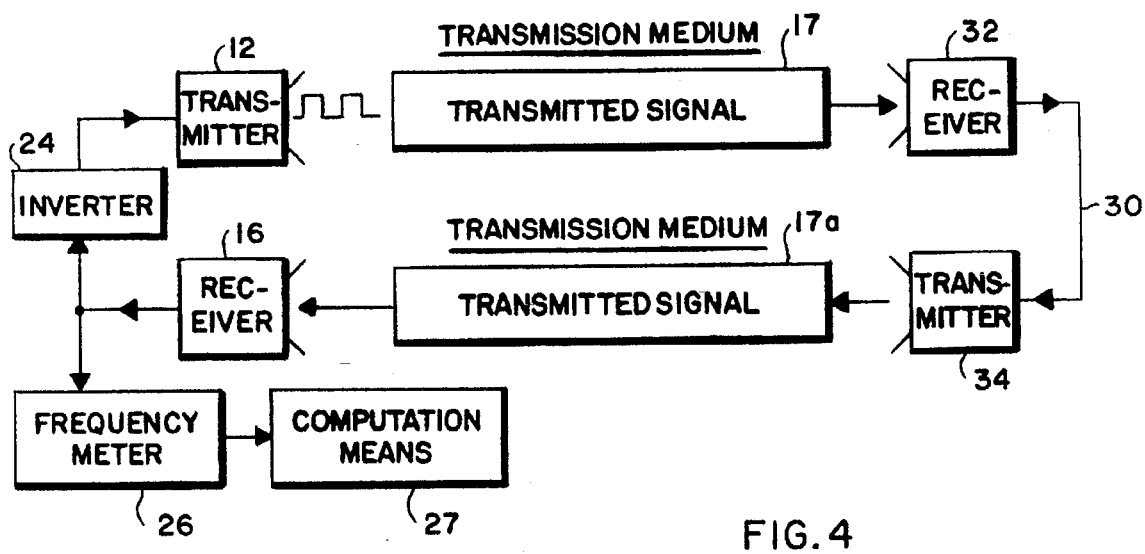

FIG. 4 is a diagrammatic view of another alternate embodiment of the invention.

Figure 5:
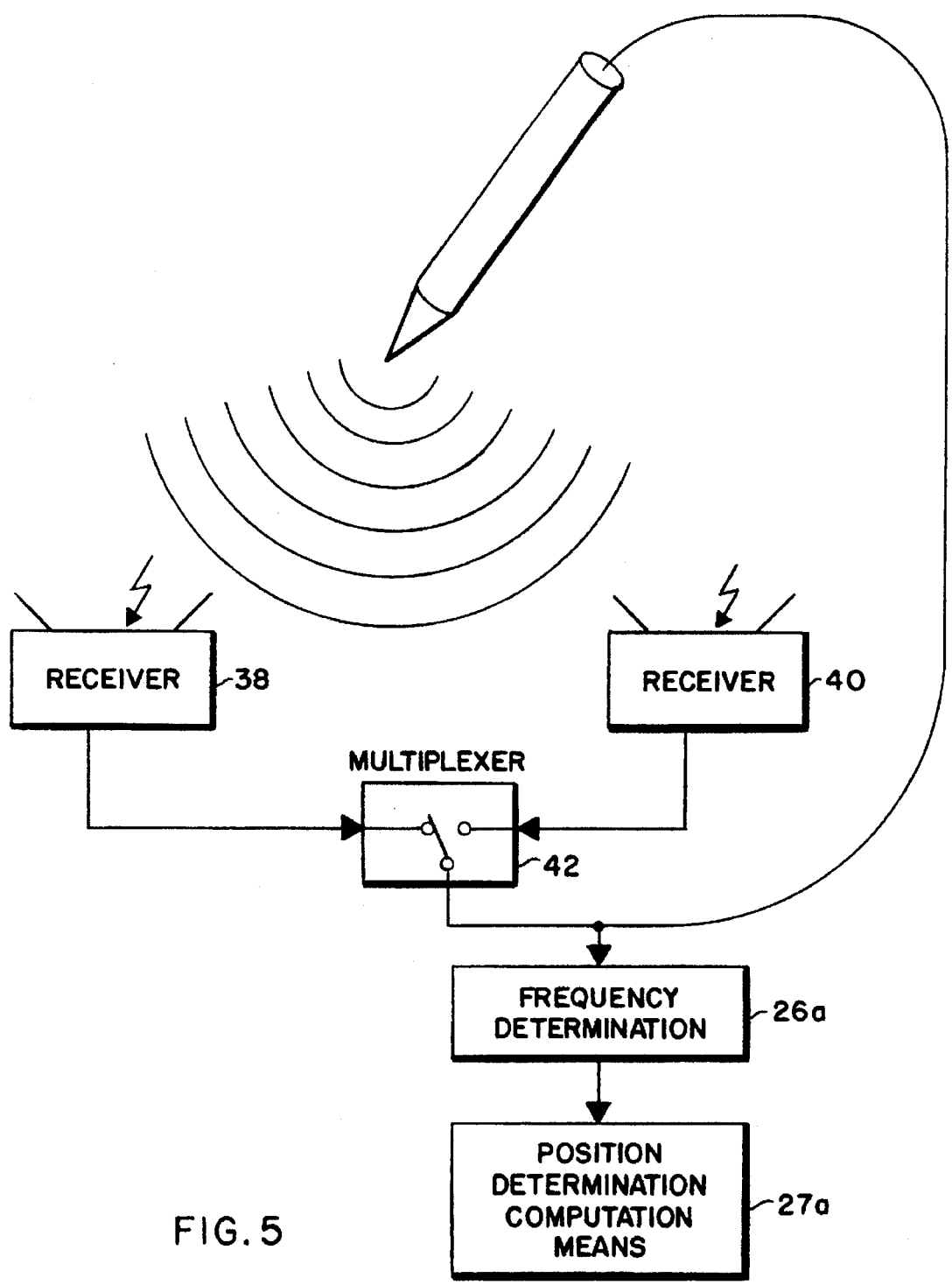

FIG. 5 is a diagrammatic view of yet another alternate embodiment of the invention.

Figure 6:
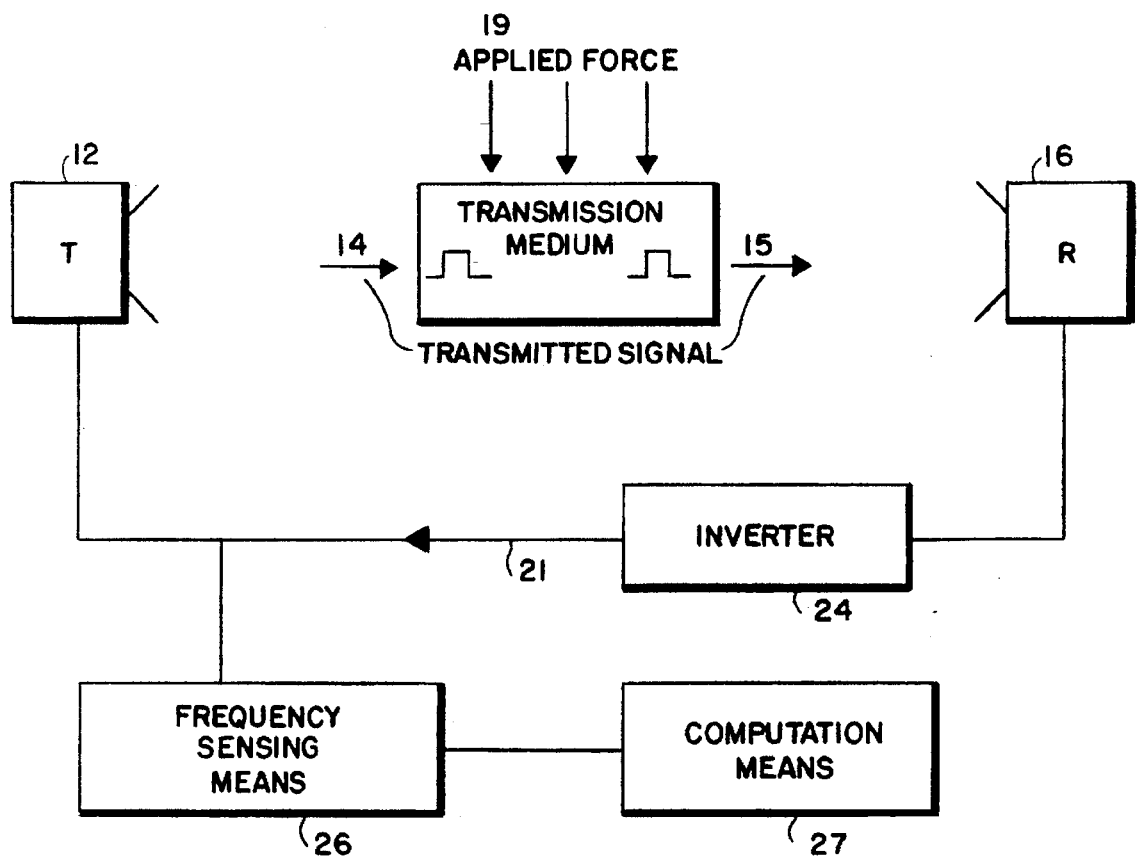

FIG. 6 is a diagrammatic view of still another embodiment of the invention.

DESCRIPTION OF THE INVENTION

Figure 1:
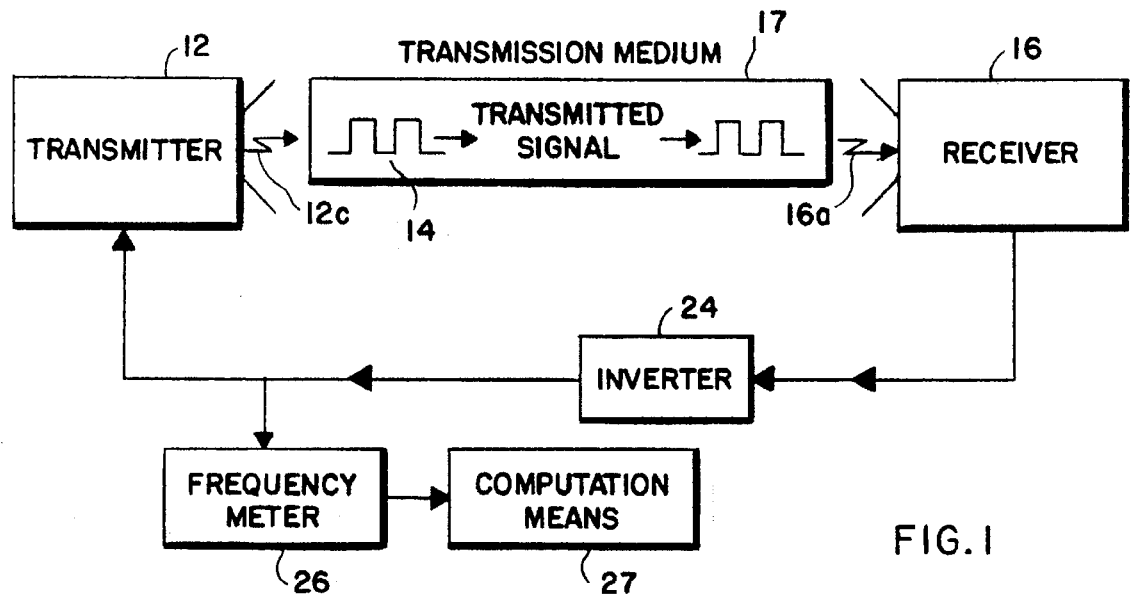
FIG. 1 is a generally diagrammatic view of one embodiment of the sensing apparatus of the present invention.

Referring to the drawings and particularly to FIG. 1, one form of the apparatus is there shown which comprises a transmitter 12 capable of emitting a modulated signal 14, a receiver 16 capable of receiving the modulated signal and transmission means 17 for conveying the transmitted signal from the transmitter to the receiver. Also comprising a part of the apparatus of this embodiment of the invention is a signal transmission means between the receiver 16 and the transmitter 12, which includes a transmission path, a transmission medium within the transmission path and an inverter means 24 for inverting the transmitted signal; a frequency determining means 26 for determining the frequency of the signal present in the transmission path; and computation means 27 for computing the signal delay time through the transmission means. Given the material properties of the transmitting medium, the computation means also functions to compute the value of the physical quality, as for example, stress or strain, which caused the observed transmission delay through the transmitting medium.

With regard the transmission means, which is identified in FIG. 1 as a transmission medium 17, this medium is selected so as to be sensitive to the particular physical quantity desired to be sensed. More particularly, the medium is chosen so that the transmission time of the transmitted signal varies according to some type of physical interference. For example, an optical fiber can be made from selected plastic materials whose index of refraction varies with applied stress or strain. If the index of refraction is made to increase, the transmission time of the transmitted signal will also increase. Conversely, if the index of refraction is made to decrease, the transmission time of the transmitted signal will also decrease. It is to be understood that, depending upon the physical quantity of interest, the transmission medium can include air, various liquids and gases and numerous other media which will appropriately convey the transmitted energy.

Turning to FIG. 2, the transmitter 12, which can take various forms well known to those skilled in the art, such as a laser diode or an LED, is here shown as a laser diode 18 capable of transmitting a modulated signal through the transmission medium. The receiver 16, shown here as comprising a photo diode 20, is adapted to receive the signal 14 after it has passed through the transmission medium. The receiver 16 will typically have an amplifier 21 to amplify the received signal. The signal transmission path, identified by the numeral 22, includes the inverter means, here provided as an inverting amplifier 24. If desired, the inverting function could be included in the amplifier stage of the receiver. However, the inverter is here shown separately for sake of clarity. Also included within the transmission path is the frequency determining means which is shown in FIG. 2 as comprising a frequency meter 26. It is to be understood that the frequency determining means can comprise any of a number of electronic frequency counters of a character well

4 known to those skilled in the art. Operably associated with the frequency meter is the previously identified computation means which can be provided as one of several types of readily commercially available digital computers. The interconnection and operation of the frequency determining means and the computation means is well within the skill of the art.

The operation of the apparatus of the invention is dependent upon establishing an oscillation in the system, the frequency of which depends on the external physical influences acting on the transmission medium which is disposed between the transmitter and receiver.

Beginning with the transmitter, assume that a signal 14, such as light emitted from a laser diode, is being emitted. After transmission of the light through the transmitting medium, and with the attendant delay caused thereby, the signal is detected by receiver 16 which comprises a photodiode 20 where it is converted to an electrical output signal. This electrical output signal is, in turn, inverted and then applied to the transmitter 12, tending to turn the transmitter off. Again after transmission through the transmitting medium, the receiver detects this lower level signal and once more converts this signal into an electrical signal. This electrical signal is in turn inverted and applied to the transmitter, tending to turn the transmitter on. At this point, the system has completed one cycle of the oscillation and is in the same state as when the oscillation began. This being the case, the system will commence with the next cycle of oscillation in the same manner as has just been explained, and the oscillations will continue so long as the apparatus remains operational.

That is, as shown in FIG. 2, diode 18 has a transistor 18a associated therewith, and the base of the transistor receives inverted signal 12a which, when high, turns the transistor on, and when low tends to turn the transistor off. Therefore, when the signal 12c outputted by the photodiode is high, the inverter's output 12a is low, and this shuts off, or mostly shuts off, the transistor 18a, so that the diode output 12c is a zero or low level signal. The receiver then receives this low level input signal 16a and outputs signal 16b, which inverter 24 inverts. This high inverted signal 12a then turns the transistor on to turn the diode on high as signal 12b from a voltage source flows through the diode.

The time to complete one cycle of the oscillation is composed of the following time intervals. The first interval is the time required for the light signal to travel from the transmitter to the receiver through the transmission medium, which may be identified as $d_o$. The next interval is the time required for the received signal to be converted to an electrical signal and be conveyed back to the transmitter. This interval may be identified as $d_e$. This time interval $d_e$ is a measurable and fixed value for a given transmission circuit operating under any particular set of conditions. The third interval is the time required for the light signal, this time a low level light signal, to once again travel from the transmitter to the receiver which is again $d_o$. The final time interval is the time for the received signal to once again be converted into an electrical signal and be conveyed back to the transmitter, which is again $d_e$.

The four time intervals described above are the four time intervals necessary to complete one cycle of oscillation in the system. The total time to complete a cycle is then simply the sum of those four intervals and can be expressed as $$d_t = 2d_e + 2d_o,$$

and can be measured in seconds or fractions of a second.

The frequency of oscillation of the system is simply the number of cycles completed in a second. This number is given as $$f=1/d_t=1/(2d_e+2d_o).$$

It can be seen that this frequency is a function of the delay time, $d_o$ between the transmitter and receiver. As shown in FIG. 1, the oscillation frequency is measured by any of a number of available frequency measuring devices. This being done, the transmission delay through the transmission medium can be determined. Furthermore, if this delay time $d_o$ through the transmission medium is made to vary under the influence of some outside physical quantity—such as the effect of stress or strain on optical fibers—it is apparent that the value of the influencing physical quantity can be readily calculated from the frequency of oscillation given the material properties of the transmission medium.

Referring to FIG. 6, the present invention can also be used as discussed above to measure an unknown applied force 19 applied to the transmission medium 17. The transmitter 12 transmits a modulated continuous signal 14 from the transmitter through the transmission medium. The unknown force applied to the transmission medium changes, the speed at which the modulated signal passes through the transmission medium to create a time-shifted modulated signal 15. The time-shifted modulated signal is received by the receiver 16, and is then processed in the processing means 25. The processed signal 21 is fed back to the transmitter to create the modulated continuous signal 14 emitted from the transmitter. The frequency of an envelope of the modulated continuous signal is measured by frequency sensing means 26 and the measured frequency is passed to the computation means 27. Within the computation means the measured frequency is correlated with known material properties of the transmission medium to determine the unknown force 19 applied to the transmission medium.

As previously mentioned, various optical fibers can be used as stress and strain sensitive transmission media. For sensing other physical properties, other media would be selected. For example, to sense temperature, a transmission medium comprising a gas at constant pressure might be used. As the temperature increased, the gas would become less dense, lowering its index of refraction and increasing the frequency of oscillation within the system. Other examples include the use of various electro-optic materials whose properties change as a function of an external electric or magnetic field. Specifically, the index of refraction of lithium niobate is sensitive to electric fields, and as such it could be used as the transmission medium in a sensor of electric field strength.

Before considering alternate forms of the invention, it is important to understand that, as opposed to other devices such as doppler radar or ring-around flow meters, the signals generated in the device of the present invention do not fundamentally depend on the velocity of any part of the sensing system or any other object of interest. At the most basic level, the device develops its output signal in response to a transmission delay between a receiver and transmitter in combination with any other delays in the system. As such, for example, when used for distance measurements, the apparatus of the invention develops an output signal that represents the distance to an object of interest regardless of whether the object is in motion or is stationary.

In contrast, the prior art doppler radar and ring-around flow meters and other similar systems develop an output signal that is fundamentally dependent on the velocity of the object of interest. Consequently, a doppler radar system will have the same output when measuring a stationary object within its range regardless of the distance to that object. It therefore does not directly measure the distance to the object.

Similarly, a ring-around flow meter develops its output signal only in response to the velocity of the medium of interest. If the medium is stationary, the output signal does not change.

FIG. 3 shows an alternate embodiment of the apparatus of the invention which is similar in many respects to the apparatus shown in FIGS. 1 and 2 and like numerals have been used to identify like components. In this second form of the invention the transmission path includes a reflecting element 28. As described previously, the frequency of oscillation of the system will still be determined by the transmission media in the transmitted and reflected paths. If so desired, however, the length of this transmission path and its attendant delay can now be varied by moving the reflector 28 nearer to or farther from the transmitter 12 and receiver 16, as well as by moving the transmitter and receiver themselves. It should be noted that the transmission media shown in FIG. 3 could be, but is not necessarily the same material.

FIG. 4 shows another embodiment of the invention which is also similar to the embodiment shown in FIG. 3, but with the reflector replaced by a receiver-transmitter pair 30. In the embodiment of the invention shown in FIG. 4, wherein like numbers are used to identify like components, the transmitted signal is received by receiver R2 (32) after a first transmission through an appropriate transmission medium. The signal is then retransmitted by transmitter T2 (34) again through a transmission medium before being received by the main receiver. The auxiliary receiver and transmitter function, much as does the reflector in FIG. 3, to relay the transmitted signal back to the receiver, and, as in the previous case, the frequency of oscillation of the system can also be varied by moving the auxiliary receiver and transmitter relative to the rest of the system.

In the embodiments of the invention shown in FIGS. 3 and 4 the frequency measurement and distance computation are carried out in a manner similar to that previously described, with details of the computation appropriate to the geometry and function of the system being taken under consideration.

It is to be understood that the signals need not be limited to optical and electrical signals. Other forms of radiation in the electromagnetic spectrum, or acoustic radiation, or any other type of controllable signal source can be used in the system in which the essential feature is that a feedback path is provided which causes the system to oscillate based on the transmission delay between a transmitting element and a receiving element.

Before considering the apparatus of the invention shown in FIG. 5, it is important to observe that the apparatus of the invention shown in FIGS. 1 through 4, and as described in the preceding paragraphs, can also be used as a positioning determining apparatus. For example, assume that the transmission medium identified in FIG. 1 is air and that the transmitter 12 is adapted to emit a signal 14 such as light from a laser diode. After transmission of the signal 14 across an intervening space with the attendant transmission delay, the signal is detected by receiver 16, where it is converted to an electrical signal. This electrical signal is in turn inverted and then applied to the transmitter 12, tending to turn the transmitter off. After transmission across the intervening space, the receiver again detects this lower level signal and once more converts this signal to an electrical signal. This electrical signal is in turn inverted and applied to the transmitter, tending to turn the transmitter on. At this point, the system, as before, has completed one complete cycle of the oscillation and is in the same state as when the oscillation began. This being the case, the system will commence with the next cycle of oscillation in the same manner as has just been explained, and the oscillations will continue.

The time to complete one cycle of the oscillation is composed of the following time intervals. The first interval is the time required for the light signal to travel along the transmission path from the transmitter to the receiver, and is denoted as $d_o$. The next interval is the time required for the received signal to be converted to an electrical signal and be conveyed back to the transmitter, and is denoted as $d_e$. This time interval $d_e$ is a measurable and fixed value for a given transmission circuit operating under any particular set of conditions. The third interval is the time required for the light signal, this time a low level light signal, to once again travel from the transmitter to the receiver which is again $d_o$. The final time interval is the time for the received signal to once again be converted to an electrical signal and conveyed back to the transmitter, which is again $d_e$.

The four time intervals described above are the four time intervals necessary to complete one cycle of the oscillation in the system. The total time to complete a cycle is then simply the sum of those four intervals and can be expressed as $$d=2d_e+2d_o,$$

and can be measured in seconds or fractions of a second.

As previously discussed, the frequency of oscillation of the system is simply the number of cycles completed in a second. This number is given as $$f=1/d_f=1/(2d_e+2d_o).$$

It can be seen that this frequency is a function of the delay time, $d_o$, between the transmitter and receiver. Specifically, if the delay time is increased by widening the separation between the transmitter and receiver, the frequency will decrease as dictated by the equation above. Conversely, if the delay time is decreased by bringing the receiver and transmitter closer together, the frequency will increase.

By measuring the oscillation frequency using frequency meter 26, the transmission delay between the transmitter and receiver can be determined, and hence the distance between the transmitter and receiver can be readily computed using appropriate computation means.

Turning now to FIG. 5, another form of position determining apparatus of the present invention is shown. This form of the invention comprises a stylus shaped transmitter 36 and two spaced apart signal receiving means, or receivers 38 and 40. Transmitter 36 can be selectively connected to receivers 38 and 40 by a switching means shown here as a standard multiplexer 42.

In using the apparatus of FIG. 5, when the transmitter 36 is connected to receiver 38 the system will oscillate at a frequency that is representative of the distance between transmitter 36 and receiver 38. By using the techniques already explained, this distance can readily be determined. In a similar fashion, when the transmitter 36 is connected to receiver 40, the distance between the transmitter and receiver 40 can be determined. With these two distances now known, computation means 27a can use any conventional method of triangulation computation to determine the position of the transmitter relative to the two receivers.

It should be noted that in this latest described embodiment of the invention, the position of the receivers and the transmitter may be interchanged, and the system will still function substantially as previously described. In such an arrangement, the stylus shaped housing in FIG. 5 would contain a receiver instead of a transmitter, and two transmitters would be substituted for the two receivers. The multiplexer would still connect an appropriate receiver and transmitter pair so that the corresponding distance measurement could be made. Much as described before, with two distance measurements accomplished, the position of the receiver could be determined relative to the two transmitters.

It should also be noted that the addition of further receivers and transmitters could enhance the functioning of the system. For example, if one transmitter (receiver) and three receivers (transmitters) were used, the position of the transmitter (receiver) could be determined in three dimensions from the three distances which could be so determined.

As a further illustration, if two transmitters (receivers) and three receivers (transmitters) were used, the position and tilt of the line connecting the two transmitters (receivers) could be determined from the six available distance measurements.

Additional receivers and transmitters may also be added in order to make the system more robust in the face of obstructions, electrical interference and "noise" in general.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A measurement device for measuring a distance by generating an oscillating continuous signal having a frequency of oscillation which has a fixed component and a variable component dependent upon the distance, and by computing the distance based on such frequency, the device comprising:

transmitter means for receiving a continuous input signal and modulating it, and for outputting the modulated input signal;

receiver means for receiving the modulated signal and for demodulating it to generate a demodulated output signal;

a transmission medium between the transmitter means and a desired position to which distance is to be measured and having a time-shifting effect on the outputted modulated signal from the transmitter means, the receiver means receiving the outputted modulated signal after it passes through the transmission medium;

output signal transmission means receiving the output signal from the receiver means, including means for processing the output signal and for inputting the processed output signal to the transmitter means to modulate the continuous input signal and cause it to switch from a first signal level to a second signal level, or from the second signal level to the first signal level, depending upon the signal level of the processed output signal for causing the modulated signal outputted from the transmitter means to have a frequency of oscillation related to the time-shifting effect;

frequency determining means connected to the output signal transmission means for measuring the frequency of oscillation between the first and second signal levels; and means connected to the frequency determining means for calculating the distance based on the measured frequency and its fixed and variable components.

2. A measurement device as claimed in claim 1, wherein the means for processing comprises means for inverting the output signal from the receiver means.

3. A measurement device as claimed in claim 1, wherein the transmission medium comprises an optical fiber.

4. A measurement device as claimed in claim 1, wherein the transmitter means comprises a laser diode, and the receiver means comprises a photodiode.

5. A method for determining a position of a target of interest by generating oscillating continuous signals having frequencies of oscillation dependent upon distances between a measurement device and the target, and by computing the position based on such frequencies, the method comprising the steps of:

selectively modulating and transmitting modulated signals through at least one transmitter and through a medium causing a time-shift in the modulated signals;

selectively receiving the modulated signals through a plurality of receiver means and demodulating them to generate the oscillating continuous signals each oscillating at a frequency related to its time-shift;

selectively coupling each of the plurality of receiver means to the transmitter means;

measuring the frequency of oscillation of the oscillating continuous signals;

calculating the distances between the measurement device and the target based on the measured frequencies of oscillation of the oscillating continuous signals; and determining the position of the target by triangulating the calculated distances between the measurement device and the target.

6. A measurement device for determining a position of a target of interest by generating oscillating continuous signals having frequencies of oscillation dependent upon distances between the measurement device and the target, and by computing the position based on such frequencies, the device comprising:

at least one transmitter means for selectively transmitting modulated signals through a medium causing a time-shift in the modulated signals;

a plurality of receiver means for selectively receiving the modulated signals and for selectively demodulating them to generate the oscillating continuous signals each oscillating at a frequency related to its time-shift;

switching means coupled to the plurality of receiver means and the transmitter means for selectively coupling each of the plurality of receiver means to the transmitter means;

frequency determining means coupled to the switching means for measuring the frequencies of oscillation of the oscillating continuous signals; and computing means coupled to the frequency determining means for calculating the distances between the measurement device and the target based on the measured frequencies of oscillation of the oscillating continuous signals and determining the position of the target based on triangulation of the calculated distances.

7. The measurement device of claim 6 wherein the computing means calculates distances between a first plurality of transmitter means and a second plurality of receiver means and determines the position including a tilt based on triangulation of the calculated distances, wherein the first and second pluralities together add up to at least five.

8. A method for measuring a distance by generating an oscillating continuous signal having a frequency of oscillation which has a fixed component and a variable component dependent upon the distance, and by computing the distance based on such frequency, the method comprising the steps of:

modulating a continuous input signal at a transmitter and transmitting the modulated input signal through a transmission medium;

receiving the modulated signal at a receiver and demodulating it to generate a demodulated output signal, the receiver being disposed at a desired position to which distance is to be measured and having a time-shifting effect on the outputted modulated signal from the transmitter means, the receiver receiving the outputted modulated signal after it passes through the transmission medium;

processing the output signal from the receiver and inputting the processed output signal to the transmitter to modulate the continuous input signal and cause it to switch from a first signal level to a second signal level, or from the second signal level to the first signal level, depending upon the signal level of the processed output signal for causing the modulated signal outputted from the transmitter means to have a frequency of oscillation related to the time-shifting effect;

measuring the frequency of oscillation between the first and second signal levels; and calculating the distance based on the measured frequency and its fixed and variable components.

* * * * *